(12) United States Patent
Hassan et al.

(10) Patent No.: US 11,496,289 B2
(45) Date of Patent: Nov. 8, 2022

(54) CRYPTOGRAPHY USING VARYING SIZED SYMBOL SETS

(71) Applicant: Microsoft Technology Licensing, LLC, Redmond, WA (US)

(72) Inventors: Amer Aref Hassan, Kirkland, WA (US); Whitney J Giaimo, Bellevue, WA (US); Roy D Kuntz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 16/985,593

(22) Filed: Aug. 5, 2020

(65) Prior Publication Data
US 2022/0045843 A1    Feb. 10, 2022

(51) Int. Cl.
*H04L 9/00* (2022.01)
*H04L 9/06* (2006.01)
*H04L 9/14* (2006.01)
*H04L 9/28* (2006.01)
*H04L 9/08* (2006.01)

(52) U.S. Cl.
CPC .......... *H04L 9/0618* (2013.01); *H04L 9/0816* (2013.01); *H04L 9/0861* (2013.01); *H04L 9/14* (2013.01)

(58) Field of Classification Search
CPC ... H04L 9/0618; H04L 9/0816; H04L 9/0861; H04L 9/14
See application file for complete search history.

(56) References Cited

U.S. PATENT DOCUMENTS

| | | | |
|---|---|---|---|
| 7,714,748 B1 | 5/2010 | Chaichanavong | |
| 9,361,617 B2 | 6/2016 | Von Mueller et al. | |
| 10,187,200 B1* | 1/2019 | Firestone | H04L 9/14 |
| 10,211,965 B2 | 2/2019 | Khandani | |
| 10,644,719 B2 | 5/2020 | Marpe et al. | |

(Continued)

FOREIGN PATENT DOCUMENTS

| | | |
|---|---|---|
| EP | 2835931 A1 | 2/2015 |
| WO | 2013003636 A2 | 1/2013 |

(Continued)

OTHER PUBLICATIONS

Alakuijala, et al., "Brotli Compressed Data Format", Retrieved From: https://tools.ietf.org/html/rfc7932, Jul. 2016, 129 Pages.

Duda, Jarek, "Asymmetric Numeral Systems: Entropy Coding Combining Speed of Huffman Coding With Compression Rate of Arithmetic Coding", In the Repository of arXiv:1311.2540v2, Jan. 6, 2014, 24 Pages.

(Continued)

*Primary Examiner* — Darshan I Dhruv
(74) *Attorney, Agent, or Firm* — Schwegman Lundberg & Woessner, P.A.

(57) ABSTRACT

Disclosed are systems, methods, and non-transitory computer-readable media for symmetric cryptography using varying sized symbol sets. To protect against a brute force or other similar type of attack, multiple symbol sets of varying sizes can be used for encrypting/decrypting data. For example, different portions of the data (e.g., data blocks representing multiple symbols, set of bits representing a single symbol) may be encrypted/decrypted using different symbol sets that include different numbers of unique symbols. Using varying sized symbol sets adds additional complexity to the encryption process, thereby greatly increasing the difficulty in decrypting the encrypted data with a brute force attack.

20 Claims, 7 Drawing Sheets

(56) References Cited

U.S. PATENT DOCUMENTS

| | | |
|---|---|---|
| 2005/0169465 A1 | 8/2005 | Itani |
| 2008/0170693 A1* | 7/2008 | Spies .................. G06Q 20/401 380/277 |
| 2010/0067687 A1 | 3/2010 | Chandramouli et al. |
| 2010/0211787 A1* | 8/2010 | Bukshpun ................ H04L 9/14 380/255 |
| 2012/0039469 A1 | 2/2012 | Mueller et al. |
| 2012/0124392 A1* | 5/2012 | Ciet ....................... H04L 9/002 713/189 |
| 2016/0021071 A1* | 1/2016 | Davydov ........... H04L 63/0435 713/150 |
| 2018/0308497 A1 | 10/2018 | Chau et al. |
| 2019/0312854 A1* | 10/2019 | Fiske .................... H04L 9/0852 |
| 2019/0394022 A1* | 12/2019 | Kaman ............... H04L 63/0428 |
| 2020/0162438 A1 | 5/2020 | Hassan et al. |
| 2021/0281406 A1* | 9/2021 | Huck ..................... H04L 9/065 |

FOREIGN PATENT DOCUMENTS

| | | | | |
|---|---|---|---|---|
| WO | WO-2017123199 A1 * | 7/2017 | ............ | G06F 7/588 |
| WO | 2019120533 A1 | 6/2019 | | |

OTHER PUBLICATIONS

Lin, Po-Han, "Base Encryption: Dynamic algorithms, Keys, and Symbol Set", Retrieved From: https://arxiv.org/html/cs/0007028, Jul. 18, 2000, 11 Pages.

Bai, et al., "Variable Size Block Encryption using Dynamic-key Mechanism (VBEDM)", In The International Journal of Computer Applications, vol. 27, Issue No. 7, Aug. 2011, pp. 27-30.

"International Search Report and Written Opinion Issued in PCT Application No. PCT/US2021/032234", dated Aug. 27, 2021, 22 Pages.

* cited by examiner

CRYPTOGRAPHY USING VARYING SIZED SYMBOL SETS

TECHNICAL FIELD

An embodiment of the present subject matter relates generally to cryptography and, more specifically, to cryptography using varying sized symbol sets.

BACKGROUND

Symmetric cryptography is commonly used to securely transmit data between devices. For example, a symmetric cryptography key is used along with a cryptography algorithm to alter a text input, referred to as plaintext, into an encrypted form, referred to as ciphertext. The ciphertext can then be transmitted to a recipient device that uses the same symmetric key and the inverse of the cryptography algorithm to decrypt the ciphertext back into plaintext. Accordingly, the symmetric key can be used to both encrypt data and decrypt data that was encrypted using the symmetric key. An attacker attempting to decrypt ciphertext may use a brute-force attack that consists of systematically checking all possible keys until the correct key is found. Accordingly, securing data is a growing concern.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
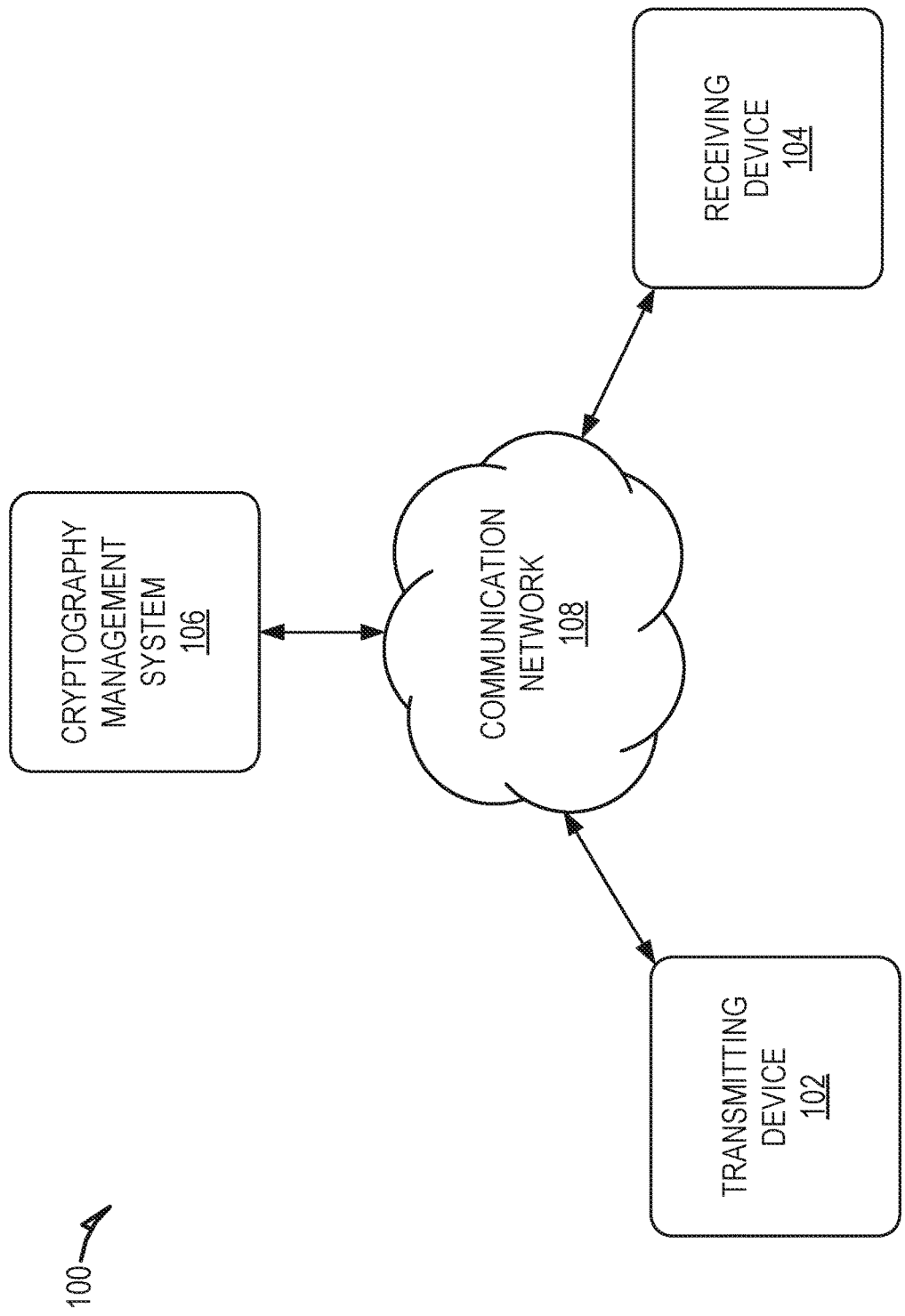
FIG. 1 is a block diagram of a system for cryptography using varying sized symbol sets, in accordance with some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for symmetric data cryptography using varying sized symbol sets. Cryptography is used to securely transmit data between devices. In symmetric cryptography, a single symmetric key is used to both encrypt and decrypt data that was encrypted using the symmetric key. To provide for secure data transmission, the symmetric key can be allocated to multiple devices and used to encrypt and decrypt data transmitted between the devices. For example, a transmitting device uses the symmetric key along with a cryptography algorithm to alter a plaintext input into an encrypted ciphertext output. The transmitting device transmits the ciphertext to a receiving device, which uses the uses the same symmetric key and the inverse of the cryptography algorithm to decrypt the ciphertext back into its original plaintext form.

Symmetric cryptography is generally performed using either a block cipher or stream cipher technique. When using block cipher, the input data is encrypted/decrypted in fixed sized data blocks that represent multiple individual symbols (e.g., multiple characters) from the plaintext or ciphertext input. For example, an input data block representing multiple symbols in the plaintext is encrypted at once using the entirety of the symmetric key. This results in an output data block of ciphertext that is of equal size and represents the same number of symbols as the input data block of plaintext.

When using stream cipher, however, the input data is encrypted/decrypted in sets of data bits that represent a single symbol (e.g., single character) from the plaintext or ciphertext input. For example, an input set of data bits representing a single symbol in the plaintext is encrypted using the symmetric key, resulting in output data representing a single symbol of ciphertext. Similar to block cipher, when using stream cipher the output data of ciphertext is of equal size and represents the same number of symbols (e.g., one) as the input data of plaintext.

In either case, the cryptography algorithm used to encrypt/decrypt data operates according to a fixed size symbol set. A symbol set defines a set of unique symbols that are used by the cryptography algorithm to group/represent the individual data bits in the plaintext, symmetric key, and/or ciphertext. A symbol set may include any number of unique symbols, however in some embodiments the symbol set may be based on different sized groupings of individual of bits. For example, a symbol set may include 2 unique symbols (e.g., binary) that can be expressed by a single bit (0, 1). As another example, the symbol set may include 16 unique symbols (e.g., hexadecimal) that can be expressed by a group of four bits (0000-1111).

The cryptography algorithm processes the individual bits of the plaintext, symmetric key, and/or ciphertext according to the fixed size symbol set being used. For example, when using a symbol set of size 2, an input data stream of "1011" is processed as four individual bits. As another example, when using a symbol set of size 4, the input data stream of "1011" is processed as two separate groupings of 2 bits (e.g., 10, 01).

Current cryptography techniques use a single fixed size symbol set when encrypting/decrypting data. For example, the cryptography algorithm uses the same fixed size symbol set to alter the entirety of the data, meaning that the bits of the plaintext, symmetric key, and/or ciphertext are all grouped in the same manner based on the symbol set size that is being used.

While current cryptography techniques provide a high level of security when transmitting data, they are still susceptible to brute force and other similar types of attacks. For example, an attacker with knowledge of the fixed size symbol set that was used to generate a ciphertext may systematically try to decrypt the ciphertext using different key values until an understandable plaintext output is generated. To further protect against a brute force or other similar type of attack, multiple symbol sets of varying size can be used when encrypting/decrypting data. For example, different portions of the data (e.g., data blocks representing multiple symbols, set of bits representing a single symbol) may be encrypted/decrypted using different symbol sets that include different numbers of unique symbols. Using varying sized symbol sets adds additional complexity to the encryption process, thereby greatly increasing the difficulty in decrypting the encrypted data with a brute force attack.

When using block cipher, additional complexity can be added by subdividing each data block into subblocks of varying sizes that are encrypted/decrypted using varying sized symbol sets. For example, a data block can be divided into multiple subblocks that include varying length subsets of the data bits included in the data block. Each subblock can then be encrypted/decrypted using a different sized symbol set. As a result, an attacker attempting to use a brute force attack to determine the key used to encrypt the data would have to not only determine the key used to encrypt the data, but also the varying symbol sets used to encrypt the data, the sizes and sequence of the subblocks of the data, and the pattern in which the varying symbol sets were applied to the subblocks of data. This additional complexity results in encrypted data that is even almost impossible to decrypt using a brute force or other similar type of attack.

To utilize varying sized symbol sets, metadata defining the various symbol sets is generated for each symmetric key and allocated to devices along with the symmetric key. For example, a cryptography management system generates a symmetric key and determines a configuration describing use of the symmetric key to encrypt/decrypt data, such as by defining the various symbol sets that are to be used, the sequence in which the symbol sets are used, the size and sequence of subblocks in which a data block is to be divided, and the like. The cryptography management system stores the determined configurations in a cryptography configuration data item that is associated with the symmetric key. The cryptography management system allocates the symmetric key and its corresponding cryptography configuration data item to devices, which can then use the cryptography configuration data item associated with the allocated symmetric key to encrypt and/or decrypt data using the various symbol sets.

FIG. 1 is a block diagram illustrating an example system 100 for symmetric data cryptography using varying sized symbol sets, in accordance with some example embodiments. As shown, the system 100 includes a transmitting device 102, a receiving device 104 and a cryptography management system 106 connected to a communication network 108 and configured to communicate with each other through use of the communication network 108. The communication network 108 is any type of network, including a local area network (LAN), such as an intranet, a wide area network (WAN), such as the interne, or any combination thereof. Further, the communication network 108 may be a public network, a private network, or a combination thereof. The communication network 108 is implemented using any number of communication links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC), or an Internet of Things (Iot) device, such as a sensor, wearable, smart meter, etc. A computing device can include some or all of the features, components, and peripherals of the machine 700 shown in FIG. 7.

To facilitate communication with other computing devices, a computing device may include a communication interface configured to receive a communication, such as a request, data, and the like, from another computing device in network communication with the computing device and pass the communication along to an appropriate module/component running on the computing device. The communication interface also sends a communication to another computing device in network communication with the computing device.

The cryptography management system 106 generates symmetric keys for use in encrypting/decrypting data. For example, the cryptography management system 106 may generate a symmetric key and allocate the symmetric key to specified devices for use in transmitting encrypted data between the devices. The cryptography management system 106 may generate the symmetric key using any of a variety of known symmetric key generation techniques or algorithms, such as a pseudorandom number generator.

In addition to generating the symmetric keys, the cryptography management system 106 also generates a cryptography configuration data item for each symmetric key. The cryptography configuration data item incudes data identifying multiple symbol sets of varying sizes to be used when encrypting and/or decrypting data using a symmetric key.

The cryptography configuration data item may include data identifying the symbol sets to be used when encrypting/decrypting data with the symmetric key, and a sequence in which the symbol sets are to be used when encrypting/decrypting data. The sequence may be a fixed repeating sequence that follows and repeats a sequential ordering of the identified symbol sets. For example, the first symbol set in the sequential order is used to encrypt a first portion of the data, followed by the second symbol set to encrypt a second portion of the data, and so on until the each symbol set in the sequential order has been used, at which time the order is repeated (e.g., the first symbol set in the sequential order is used again).

Alternatively, the sequence may be varied such that the order in which the symbol sets are used changes from one iteration to the next, rather than repeating. For example, the sequential order of the symbol sets may be modified per iteration. As another example, the sequential order of the symbol sets may remain the same from one iteration to the next, however the manner in which the sequential order of the symbol sets is applied may be changed, such as being applied in reverse order or beginning from a different initial symbol set than in a previous iteration.

When using block cipher, rather than stream cipher, additional complexity may also be applied. For example, each data block may be divided into subblocks and different symbol sets may be used to encrypt/decrypt each subblock. The subblocks may also be of varying sizes. Accordingly, the cryptography configuration data item may also include data defining the subblock sizes into which a data block is to be divided. For example, the cryptography configuration data item may define a fixed subblock size such that a data block will subdivided into multiple subblocks of the same size. As another example, the cryptography configuration data item may define various subblocks sizes such that a data block is subdivided into multiple subblock of varying sizes.

The cryptography configuration data item may also identify a sequence in which the various subblock sizes are to be used when dividing a data block into subblocks. Similar to the sequence defined for the symbol sets, the sequence for the subblock sizes may be a fixed repeating sequence that follows and repeats a sequential ordering of the subblock sizes such that each individual data block is broken into subblocks in the same manner. Alternatively, the sequence may be varied such that the order in which the subblock sizes are used to divide a data block changes from one data block to the next.

The cryptography configuration data item for a symmetric key may include any number of symbol sets and subblock sizes. Further, the number of symbol sets and the number of subblock sizes may be the same or different. For example, the cryptography configuration data item may identify two different symbol sets and three different subblock sizes. As another example, the cryptography configuration data item may identify three different symbol sets and two different subblock sizes. These are only two possible examples, however, and are not meant to be limiting. Any number and combination of symbol sets and subblock sizes may be used.

The cryptography management system 106 allocates the symmetric key and its corresponding cryptography configuration data item to devices, such as transmitting device 102 and receiving device 104, for use in securely transmitting data between the devices. For example, the cryptography management system 106 may allocate the symmetrical key and the cryptography configuration data item to both the transmitting device 102 and the receiving device 104. The transmitting device 102 may use the symmetric key and corresponding cryptography configuration data item to encrypt data, which can then be transmitted to the receiving device 104 via the communication network 108. The receiving device 104 may similarly use the same symmetric key and corresponding cryptography configuration data item to decrypt the encrypted data received from the transmitting device 102.

Although the shown system 100 includes only one transmitting device 102 and one receiving device 104, this is for ease of explanation and is not meant to be limiting. One skilled in the art would appreciate that the system 100 can include any number of transmitting devices 102 and/or receiving devices 104. While the transmitting device 102 and receiving device 104 are described separately, this too is for ease of explanation and it not meant to be limiting. For example, a transmitting device 102 can also be a receiving device 104, and vice versa. That is, the transmitting device 102 may perform the functionality described in relation to the receiving device 104, such as receiving encrypted data from another device and using a symmetric key and corresponding cryptography configuration data item to decrypt the encrypted data. Similarly, the receiving device 104 may perform the functionality described in relation to the transmitting device 102, such using a symmetric key and corresponding cryptography configuration data item to encrypt data and transmit the encrypted data to another device.

The cryptography management system 106 may concurrently accept connections from and interact with any number of transmitting devices 102 and/or receiving devices 104. The cryptography management system 106 may support connections from a variety of different types of transmitting devices 102 and/or receiving devices, such as desktop computers; mobile computers; mobile communications devices, e.g., mobile phones, smart phones, tablets; smart televisions; set-top boxes; keypads, and/or any other network enabled computing devices. Hence, the transmitting device 102 and the receiving device 104 may be of varying type, capabilities, operating systems, and so forth.

Figure 2:
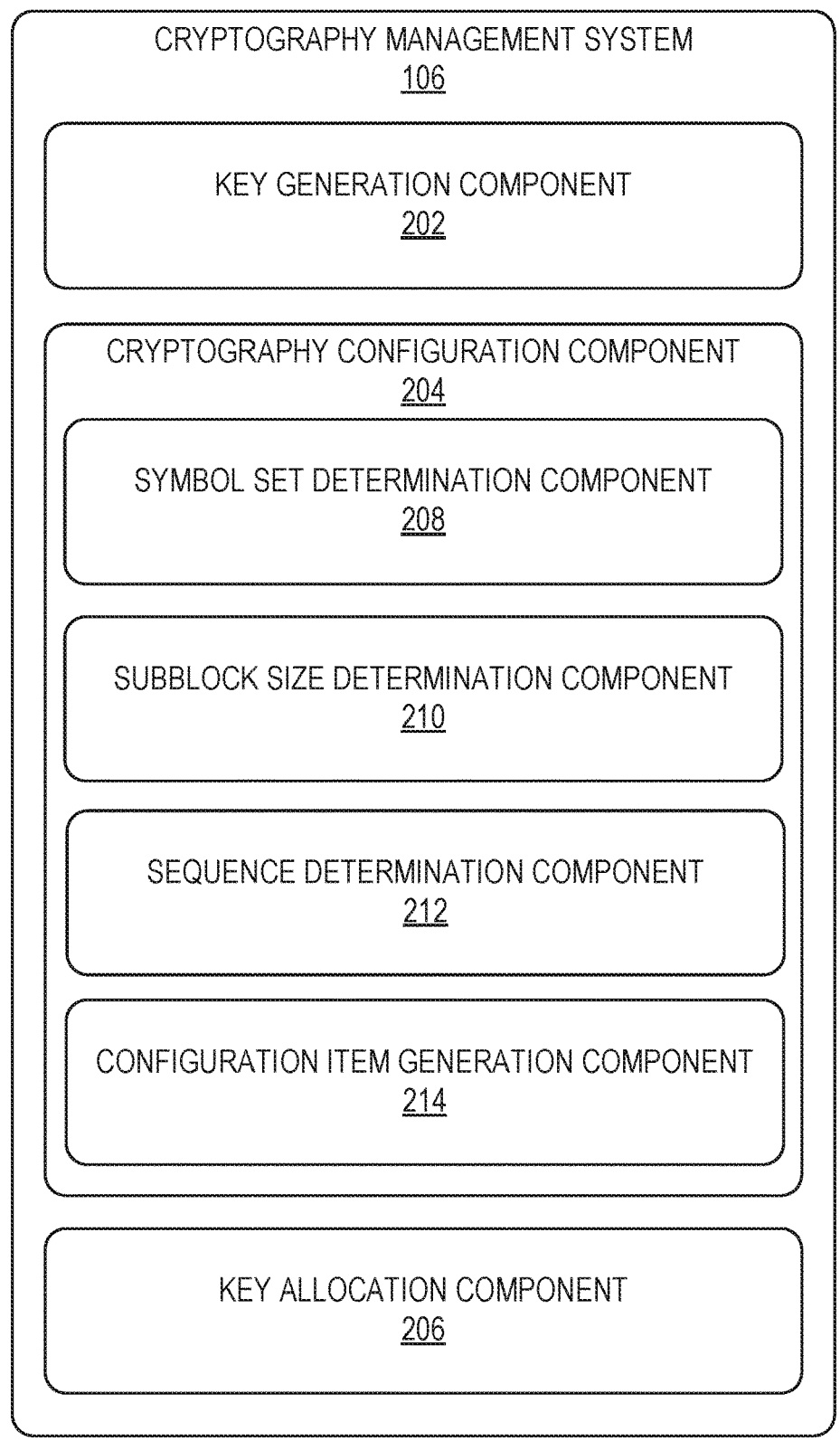
FIG. 2 is a block diagram of a cryptography management system, according to some example embodiments.

FIG. 2 is a block diagram of a cryptography management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the cryptography management system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the cryptography management system 106 includes a key generation component 202, a cryptography configuration component 204, and a key allocation component 206. The key generation component 202 generates symmetric keys used for data encryption and decryption. Each symmetric key can be used to both encrypt data and decrypt data encrypted with the symmetric key. For example, a symmetric key can be used along with a cryptography algorithm to alter a plaintext input into an encrypted ciphertext output. Similarly, the same symmetric key and the inverse of the cryptography algorithm can be used to decrypt the ciphertext back into its original plaintext form.

A symmetric key is comprised of a sequentially ordered set of bits of a fixed length. The length of the symmetric key (e.g., number of bits included in the symmetric key) may be any of a variety of lengths, such as 128 bits, 192 bits, 256 bits, and the like. The key generation component 202 may generate a symmetric key using any of a variety of known key generation algorithms, such as a pseudorandom number generator.

The cryptography configuration component 204 generates a cryptography configuration data item for a symmetric key. The cryptography configuration data item defines a set of configurations for encrypting/decrypting data using the symmetric key corresponding to the cryptography configuration data item. For example, the cryptography configuration data item may include data defining the various symbol sets that are to be used when encrypting/decrypting data, the sequence in which the symbol sets are to be used, the subblock size and sequence of subblocks in which a data block is to be divided (e.g., when using block cipher), and the like.

As shown, the cryptography configuration component 204 includes a symbol set determination component 208, a subblock size determination component 210, a sequence determination component 212, and a configuration item generation component 214.

The symbol set determination component 208 determines the symbol sets to be used with a symmetric key. To accomplish this, the symbol set determination component 208 may select the symbol sets randomly from a set of predetermined symbol sets. Each symbol set is defined by the number of unique symbols in the symbol set.

While a symbol set may include any number of unique symbols, in some embodiments, the number of unique symbols included in the symbol sets may be based on different sized groupings of individual of bits. For example, a symbol set may be based on a grouping of a single bit (e.g., binary) and therefore include 2 unique symbols (e.g., 0, 1). As another example, a symbol set may be based on a grouping of three bits (e.g., octal) and therefore include 8 unique symbols (e.g., 000-111). As another example, a symbol set may be based on a grouping of four bits (e.g., hexadecimal) and therefore include 16 unique symbols (e.g., 0000-1111).

In some embodiments, a symbol set may include unique symbols that are geometric figures, rather than traditional numbers or character. For example, a symbol set may include geometric symbols such as a pentagon, rectangle, rhombus, circle, and the like. In this type of embodiment, each symbol in the symbol set may be represented by a collection of binary geometric figures such as triangles, lines, and the like, rather than binary values of bits. An example of a symbol set including geometric figures is described in U.S. patent Ser. No. 16/884,749, the contents of which are hereby incorporated by reference in their entirety.

As another example, a symbol set may include unique symbols that are codes, such as a Quick Response (QR) code or barcode. In this type of embodiment, each symbol in the symbol set may be represented by a collection of smaller codes, such as smaller portions of a QR code or bar code, rather than binary values of bits.

The symbol set determination component 208 may use an algorithm that randomly selects 2 or more symbol sets to be used with a symmetric key. In some embodiments, the symbol set determination component 208 may select a fixed number of symbol sets for each symmetric key. For example, the symbol set determination component 208 may select 2 of the symbol sets for each symmetric key. As another example, the symbol set determination component 208 may select 3 of the symbol sets for each symmetric key. While the number of symbol sets selected for each symmetric key may be the fixed, the symbol sets selected for each symmetric key may be varied.

Alternatively, in some embodiments, the number of symbol sets selected for each symmetric key may also be varied. For example, the symbol set determination component 208 may select either 2, 3, 4, etc., symbol sets to be used with each of the symmetric keys. Accordingly, the number of symbol sets used to encrypt/decrypt data may be varied among the various symmetric keys.

The subblock size determination component 210 determines the subblock sizes of the subblocks into which a data block is to be divided for encryption/decryption. The subblock sizes determined by the subblock size determination component 210 are used when encrypting/decrypting data using block cipher, rather than stream cipher. In block cipher, the input data is encrypted/decrypted in equal sized data block. To add complexity during the encryption/decryption process, each data block may be divided into multiple subblocks, which may be of varying subblock sizes. The subblock sizes determined by the subblock size determination component 210 define the sizes (e.g., number of bits) of the subblocks into which the data blocks are to be divided. For example, the subblock sizes may define a number of bits that is smaller than a total number of bits in each data block.

The subblock size determination component 210 may determine any number of subblock sizes for a symmetric key. Further, the number of subblock sizes determined for each symmetric key may be fixed or variable. For example, the subblock size determination component 210 may determine a fixed number of subblock sizes for each symmetric key, such as 2 subblock sizes, 3 subblock sizes, etc. As another example, the subblock size determination component 210 may determine a different number of subblock sizes for different symmetric keys.

The subblock size determination component 210 determines the subblock sizes for each symmetrical key using any of a variety of techniques or algorithms. In some embodiments, the subblock size determination component 210 may determine the subblock sizes based on predetermined groupings of subblock sizes. Each predetermined grouping of sizes may include a set of two or more sizes. The sizes in each predetermined grouping may be defined such that the sum of the subblock sizes in the predetermined grouping of subblock sizes equals the size of the data blocks used for encryption/decryption with block cipher.

In some embodiments, the subblock size determination component 210 determines the subblock sizes using an algorithm that randomly selects the subblock sizes based on one or more constraints. For example, the constraints may define a minimum or maximum number of subblocks or subblock sizes, a minimum or maximum subblock size, a requirement that the sum of the subblock sizes equal a specified size (e.g., the size of the data block), and the like.

These are just two examples of how the subblock size determination component 210 may determine the subblock sizes for a symmetric key and are not meant to be limiting. The subblock size determination component 210 may use any of a variety of algorithms and techniques to determine the subblock sizes.

The sequence determination component 212 determines a sequence in which the symbol sets and, depending on embodiment, subblock sizes are to be applied when encrypting/decrypting data using the symmetric key. The sequence determination component 212 may select a sequence at random. For example, the sequence determination component 212 receives data from the symbol set determination component 208 and/or subblock size determining component 210 indicating the number of symbol sets and/or subblock sizes that were selected for use with a symmetrical key. The data may include identifiers assigned to each symbol set and/or subblock sizes.

The sequence determination component 212 then determines a sequence for the symbol sets and/or subblock sizes. For example, the sequence determination component 212 determines a sequential order in which the symbol sets and/or subblock sizes are to be used when encrypting/decrypting data. This may be accomplished using an algorithm that randomly assigns an order to the symbol sets and/or subblock sizes. As another example, the sequence determination component 212 may randomly select a sequential sequence from a set of predetermined sequential sequences.

In some embodiments, the sequences for each of the symbol sizes and/or subblock sizes may be simply repeated from one iteration to the next. Alternatively, the sequences may vary from one iteration to the next, such as by being performed in reverse order, staring from a different point in the sequential order per iteration, and the like. Accordingly, the sequence determination component 212 may also determine how the sequences are to be applied per iteration. For example, three symbol sets (S1, S2, and S3) may be arranged in a sequential order of S1, S2 and S3. In a first iteration, the symbol sets may be applied according to the sequential order such that S1 is used for a first portion of data, S2 is used for a second portion of data, and S3 is used for a third portion of data. In the next iteration however, the order my be varied such that the sequential order is applied in reverse (e.g., S3, S2, S1) or starting from a differing initial symbol set (e.g., S2, S3, S1).

The symbol set determination component 208, subblock size determination component 210, and the sequence determination component 212 provide data identifying the selected symbols sets, subblock sizes, and sequences to the configuration item generation component 214. In turn, the configuration item generation component 214 generates a cryptography configuration data item based on the received data. The cryptography configuration data item may be a metadata file that identifies the selected symbols sets, subblock sizes, and sequences for the symmetrical key. The resulting cryptography configuration data item may be associated with a symmetric key for use when encrypting/decrypting data.

The key allocation component 206 allocates the symmetrical keys and their corresponding cryptography configuration data items to devices for use in encrypting/decrypting data transmitted between the devices. For example, the key allocation component 206 may allocate the same symmetrical key and its corresponding cryptography configuration data item to a transmitting device 102 and a receiving device 104. The transmitting device 102 uses the symmetric key and a cryptography algorithm according to the cryptography configuration data item to alter a plaintext input into an encrypted ciphertext output. Similarly, the receiving device 104 uses the uses the same symmetric key and the inverse of the cryptography algorithm according to the cryptography configuration data item to decrypt the ciphertext back into its original plaintext form. Examples of encrypting/decrypting data using an asymmetric key and corresponding cryptography data item are described below in relation to FIGS. 3 and 4.

Figure 3:
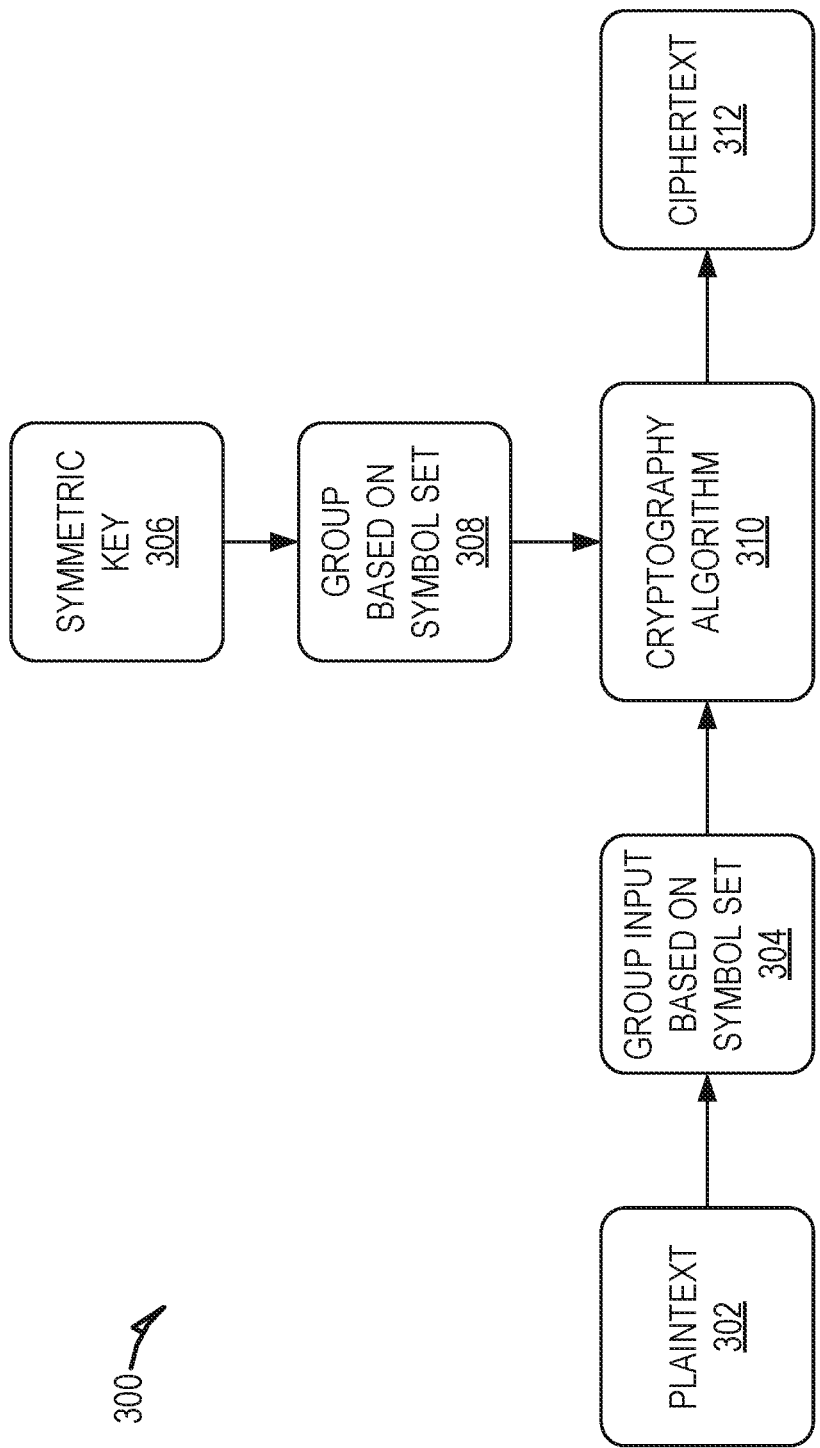
FIG. 3 shows operations for using varying sized symbol sets with stream cipher, according to some example embodiments.

FIG. 3 shows operations 300 for using varying sized symbol sets with stream cipher, according to some example embodiments. When using stream cipher, the input data is encrypted/decrypted in sets of data bits that represent a single symbol (e.g., single character) from the plaintext or ciphertext input. For example, an input set of data bits representing a single symbol in the plaintext is encrypted using a corresponding set of data bits from the symmetric key, resulting in output data representing a single symbol of ciphertext. The size of the input (e.g., number of bits of plaintext) and the size of symmetric key (e.g., number of bits of the symmetric key) are generally the same or proportional. For example, 4 bits of data input may be encrypted with 4 bits of the symmetric key.

Further, subsequent sets of bits of the symmetric key are used to encrypt/decrypt each subsequent set of bits of the input. For example, the first 4 bits of the symmetric key may be used to encrypt/decrypt the first 4 bits of the input, the second 4 bits of the symmetric key may be used to encrypt/decrypt the second 4 bits of the input, and so on.

The size of the input (e.g., plaintext bits, ciphertext bits) and symmetric key (e.g., symmetric key bits) are based on the symbol set that is being used. While current stream cipher systems use a fixed size of the input and symmetric key based on a symbol set to encrypt/decrypt the entirety of data, various sizes of the input and symmetric key based on different symbol sets can be used to increase security of the encrypted data.

As shown in FIG. 3, plaintext 302 input is grouped based on a symbol set 304. Similarly, the symmetric key 306 is also grouped based on the symbol set 308. The symbol set used to group the plaintext 302 input and the symmetric key 306 is determined and varied based on the cryptography configuration data item corresponding to the symmetric key 306. For example, the cryptography configuration data item may identify multiple symbol sets of varying sizes and a sequence in which the symbol sets are to be used. Accordingly, the plaintext 302 and the symmetric key 306 are both grouped based on the symbol sets and sequence identified in the cryptography configuration data item. For example, a first set of bits of the plaintext 302 and a first set of bits of the symmetric key 306 may be grouped based on a hexadecimal symbol set that includes 16 unique symbols. As a result, the first set of bits of the plaintext 302 and the symmetric key 306 may each include 4 bits to represent a single hexadecimal symbol. The resulting groups of bits representing a hexadecimal symbol of plaintext and a hexadecimal symbol of the symmetric key 306 are then provided as input into the cryptography algorithm 310, which outputs a first set of bits of ciphertext 312. The first set of bits of ciphertext 312 may also include 4 bits representing a hexadecimal symbol of ciphertext 312.

A subsequent set of bits of the plaintext 302 may then be encrypted based on a different symbol set. For example, the subsequent set of bits of the plaintext 302 may be encrypted based on an octal symbol set that includes 8 unique symbols. As a result, the subsequent set of bits of the plaintext 302 and the symmetric key 306 may each include 3 bits to represent a single octal symbol. The resulting groups of bits representing an octal symbol of plaintext and an octal symbol of the symmetric key 306 are then provided as input into the cryptography algorithm 310, which outputs a subsequent set of bits of ciphertext 312. The subsequent set of bits of ciphertext 312 may also include 3 bits representing an octal symbol of ciphertext 312. This process may be repeated according to the symbol sets and sequence specified in the cryptography configuration data item until the entire plaintext 302 has been encrypted into ciphertext 312.

The same process can be used to decrypt the ciphertext 312 back to plaintext 302. For example, the ciphertext 312 can be used as input rather than the plaintext 302. That is, sets of bits of the ciphertext 312 and symmetric key 306 are grouped according to the cryptography configuration data item and the resulting grouping of bits are used as input into the cryptography algorithm 310. An inverse of the cryptography algorithm 310 is performed to transform the grouped set of bits of ciphertext 312 back to a grouped set of bits of plaintext 302.

Figure 4:
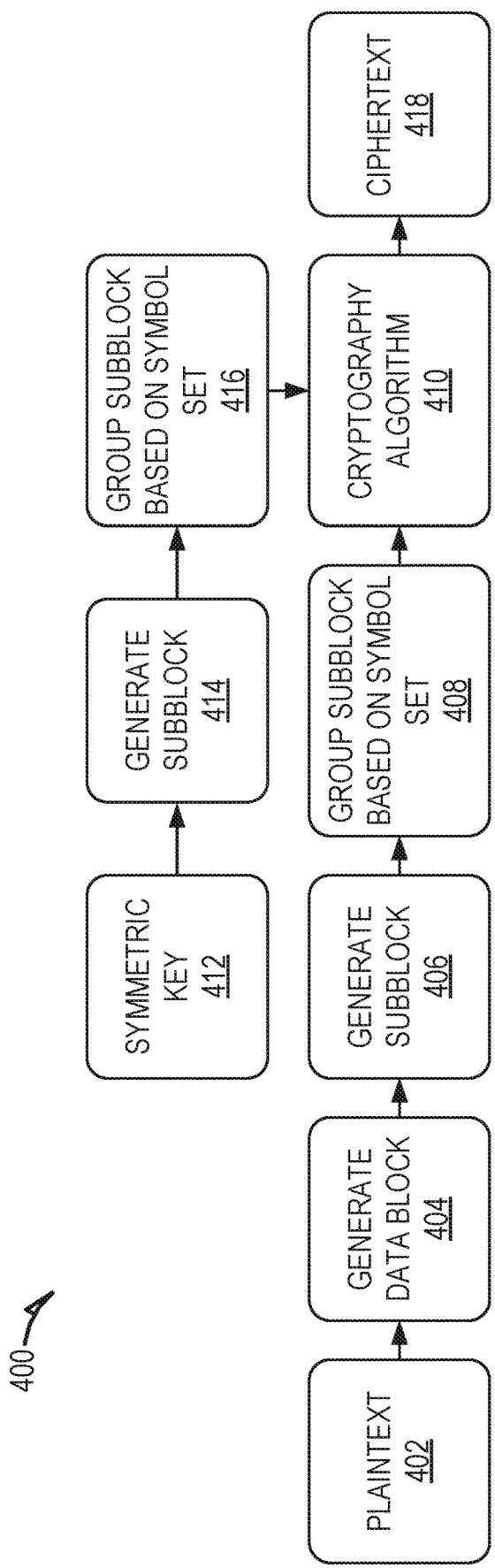
FIG. 4 shows operations for using varying sized symbol sets with block cipher, according to some example embodiments.

FIG. 4 shows operations 400 for using varying sized symbol sets with block cipher, according to some example embodiments. When using block cipher, the input data is encrypted/decrypted in fixed sized data blocks that represent multiple individual symbols (e.g., multiple characters) from the plaintext 402 or ciphertext 418. For example, an input data block of data representing multiple symbols in the plaintext 402 is encrypted at once using the entirety of the symmetric key 412. This results in an output data block of ciphertext 418 that is of equal size and represents the same number of symbols as the input data block of plaintext 402.

Each data block is encrypted/decrypted according to a defined symbol set. For example, the individual data bits in the input data block and the symmetric key 412 are grouped according to the symbol set to represent a sequence of symbols from the symbol set. The data block is then encrypted/decrypted based on the sequences of symbols, rather than individual symbols as with stream cipher.

Current block ciphers use the same symbol set to encrypt/decrypt each data block. To provide additional security to the encrypted data, multiple symbol sets may be used. For example, the symbol set used for each data block may be varied. As a result, one data block may be encrypted/decrypted based on a binary symbol set including 2 unique symbols, another data block may be encrypted/decrypted based on an octal symbol set including 8 unique symbols, and another data block may be encrypted/decrypted based on hexadecimal symbol set including 16 unique symbols. To provide additional complexity, in some embodiments, one or more of the data blocks may be divided into subblocks of varying or equal length and each subblock may be encrypted/decrypted according to a different symbol set.

As shown in FIG. 4, a plaintext 402 input is divided into a fixed size data block 404. The fixed size data block may then be divided into subblocks 406 of equal and/or varying subblock sizes (e.g., number of bits). The subblock sizes and sequence may be defined by the cryptography configuration data item corresponding to the symmetric key 412. Each subblock of the plaintext 402 input may then be grouped based on a symbol set 408. This results in a sequence of symbols from the symbol set 408 that represent the subblock of the plaintext 402.

Similarly, the symmetric key 412 is also divided into subblocks 414 based on the subblock sizes and sequence defined by the cryptography configuration data item corresponding to the symmetric key 412. Each subblock of the symmetric key 412 is then grouped based on the same symbol set 416 used to group the subblock of plaintext 402. This results in a sequence of symbols from the symbol set 408 that represent the subblock of the symmetric key 412.

The sequence of symbols representing the subblock of the plaintext 402 and the sequence of symbols representing the subblock of the symmetric key 412 are then used as input into the cryptography algorithm 410. The cryptography algorithm 410 generates ciphertext 418 based on the provided input. The ciphertext 418 may be of equal size as the subblock of the plaintext 402 provided as input.

Each subsequent subblock of the plaintext 402 may be processed in a similar manner based on the corresponding subsequent subblock of symmetric key 412. The symbol sets, subblock sizes and sequences of each are defined by the cryptography configuration data item. This process may be repeated until the entire plaintext 402 has been encrypted into ciphertext 418.

The same process can be used to decrypt the ciphertext 418 back to plaintext 402. For example, the ciphertext 418 can be used as input rather than the plaintext 402. That is, the ciphertext 418 may be divided into fixed size data blocks, each of which may be divided into subblocks of varying subblock sizes defined by the cryptography configuration data item. Each subblock of the ciphertext 418 may then be grouped based on a symbol set defined by the cryptography configuration data item, resulting in a sequence of symbols from the symbol set that represent the subblock of the ciphertext 418. Similarly, the symmetric key 412 may also be divided into subblocks and grouped based on the symbol sets, subblock sizes and sequences defined by the cryptography configuration data item. The sequence of symbols from the symbol set representing the ciphertext 418 and the symmetric key 412 may be provided as input into the cryptography algorithm 410. An inverse of the cryptography algorithm 410 is performed to transform each subblock of ciphertext 418 back to plaintext 402.

Figure 5:
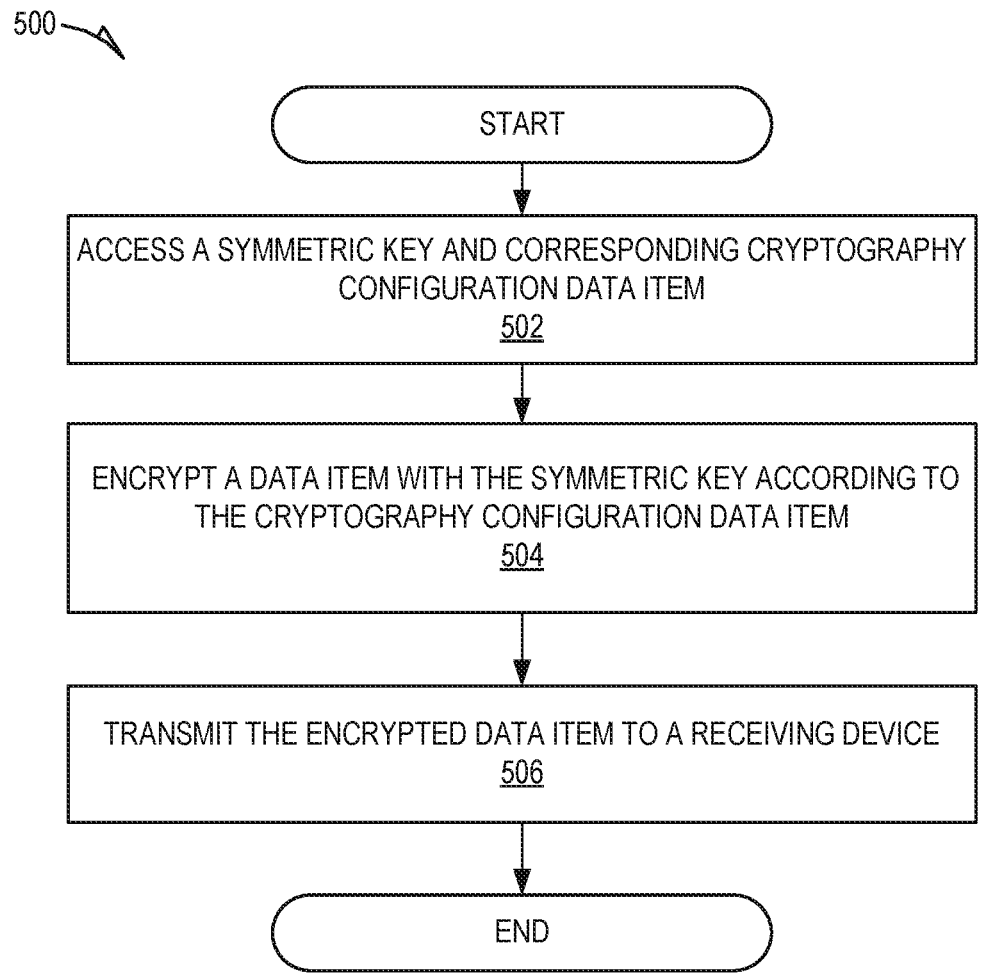
FIG. 5 is a flowchart showing an example method for cryptography using varying sized symbol sets, according to certain example embodiments.

FIG. 5 is a flowchart showing an example method 500 for cryptography using varying sized symbol sets, according to certain example embodiments. The method 500 may be embodied in computer readable instructions for execution by one or more processors such that the operations of the method 500 may be performed in part or in whole by the transmitting device 102; accordingly, the method 500 is described below by way of example with reference thereto. However, it shall be appreciated that at least some of the operations of the method 500 may be deployed on various other hardware configurations and the method 500 is not intended to be limited to the transmitting device 102.

At operation 502, the transmitting device 102 accesses a symmetric key and corresponding cryptography configuration data item. The cryptography configuration data item identifies multiple symbol sets to be used when encrypting/decrypting data with the symmetric key. Each identified symbol set may be of varying sizes, meaning that each symbol set may include a different number of unique symbols, such as 2, 4, 8, 16, etc. The cryptography configuration data item may also include a sequence in which the symbol sets are to be used, such as by defining a sequential order in which the symbol sets are to be used when encrypting different portions of a data item (e.g., plaintext).

At operation 504, the transmitting device 102 encrypts a data item with the symmetric key according to the cryptography configuration data item. For example, the transmitting device 102 may encrypt various portions of the data item based on the different symbol sets and in the sequence identified in the cryptography configuration data item.

The size of each portion of the data item may be based on the technique used to encrypt the data item. For example, when using stream cipher, the portions of the data item may be sets of bits representing a single character of the symbol set that is being used. In this type of embodiment, the transmitting device 102 groups individual bits of the data input based on the symbol set that is used such that the resulting group of input bits (e.g., portion of the data input) represents a single symbol in the symbol set. For example, when using a hexadecimal symbol set with 16 unique symbols, the transmitting device 102 may group 4 bits of the input data item, which represent one hexadecimal symbol. As another example, when using a binary symbol set with 2 unique symbols, the transmitting device 102 may group a single bit of the input data item, which represent one binary symbol.

When using block cipher, however, the portions of the data item that are encrypted using the various symbol sets may be fixed size data blocks or subblocks of a fixed size data block. In this type of embodiment, the transmitting device 102 initially groups individual bits of the data input into fixed sized data blocks. Depending on the implementation, the fixed size data block may be encrypted as a whole using one of the symbol sets, or the fixed size data block may be further subdivided into subblocks which are encrypted separately using different symbol sets. The subblock sizes and sequence are defined by the cryptography configuration data item.

At operation 506, the transmitting device 102 transmits the encrypted data item to a receiving device 104. The receiving device 104 may decrypt the encrypted data item using the same symmetric key and cryptography configuration data item. For example, the receiving device 104 may decrypt portions of the encrypted data item using the symbol set that was used by the transmitting device 102 to encrypt the corresponding portion of the data input.

Software Architecture

Figure 6:
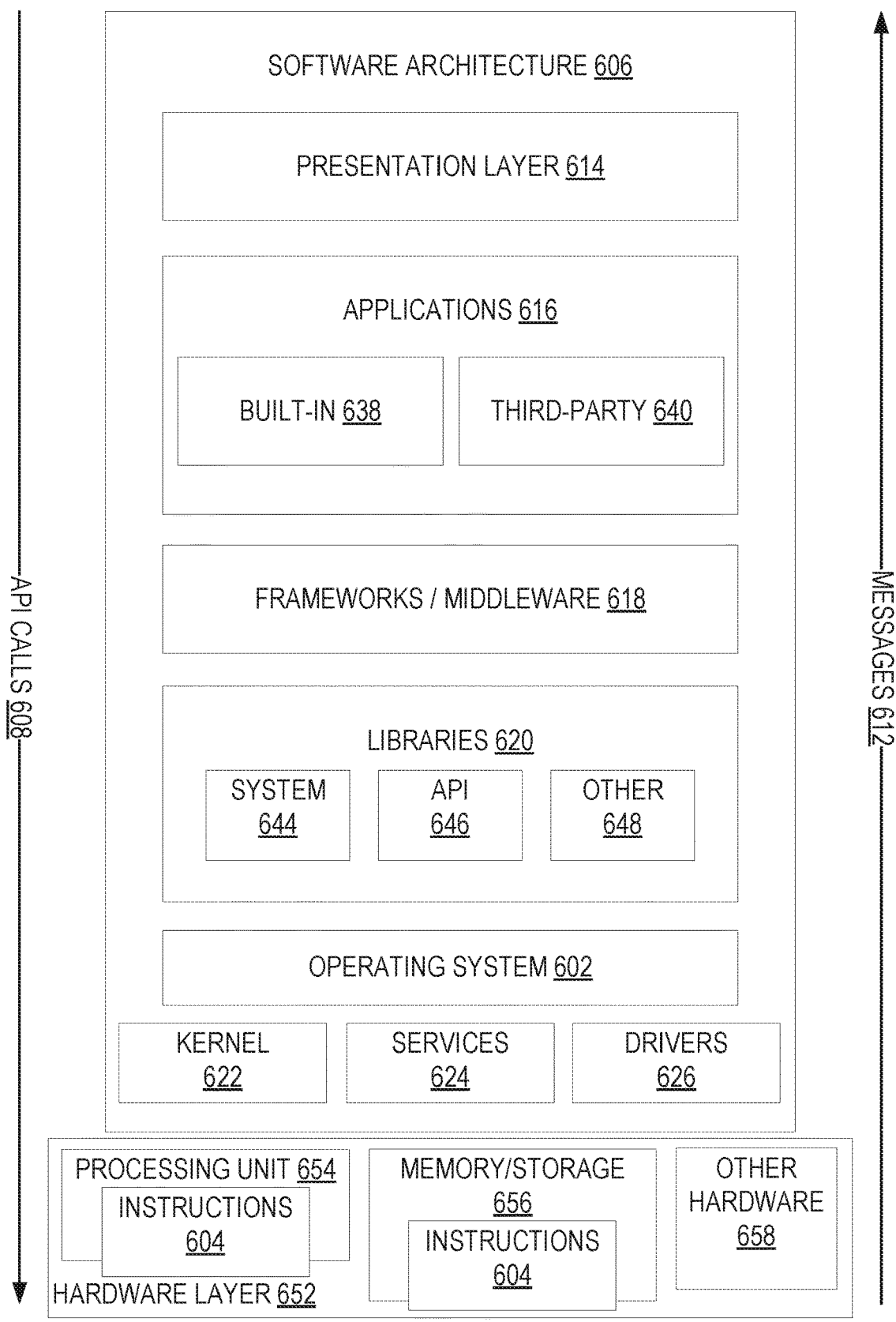
FIG. 6 is a block diagram illustrating a representative software architecture, which may be used in conjunction with various hardware architectures herein described.

FIG. 6 is a block diagram illustrating an example software architecture 606, which may be used in conjunction with various hardware architectures herein described. FIG. 6 is a non-limiting example of a software architecture 606 and it will be appreciated that many other architectures may be implemented to facilitate the functionality described herein. The software architecture 606 may execute on hardware such as machine 700 of FIG. 7 that includes, among other things, processors 704, memory 714, and (input/output) I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components, and so forth described herein. The hardware layer 652 also includes memory and/or storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, frameworks/middleware 618, applications 616, and a presentation layer 614. Operationally, the applications 616 and/or other components within the layers may invoke application programming interface (API) calls 608 through the software stack and receive a response such as messages 612 in response to the API calls 608. The layers illustrated are representative in nature and not all software architectures have all layers. For example, some mobile or special purpose operating systems may not provide a frameworks/middleware 618, while others may provide such a layer. Other software architectures may include additional or different layers.

The operating system 602 may manage hardware resources and provide common services. The operating system 602 may include, for example, a kernel 622, services 624, and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624, and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphical user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 640 may invoke the API calls 608 provided by the mobile operating system (such as operating system 602) to facilitate functionality described herein.

The applications 616 may use built in operating system functions (e.g., kernel 622, services 624, and/or drivers 626), libraries 620, and frameworks/middleware 618 to create UIs to interact with users of the system. Alternatively, or additionally, in some systems, interactions with a user may occur through a presentation layer, such as presentation layer 614. In these systems, the application/component "logic" can be separated from the aspects of the application/component that interact with a user.

Figure 7:
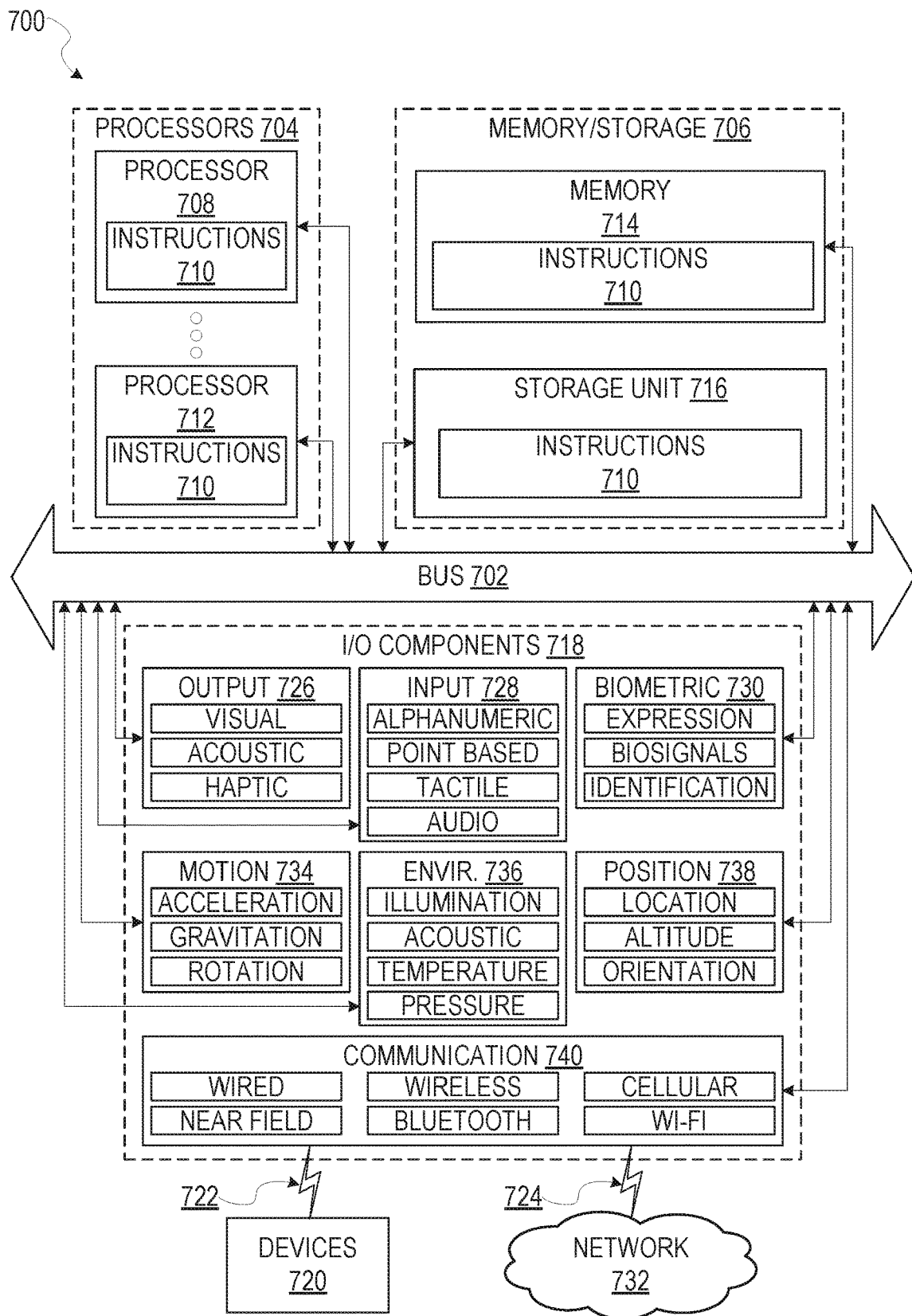
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating components of a machine 700, according to some example embodiments, able to read instructions 604 from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines that individually or jointly execute the instructions 710 to perform any one or more of the methodologies discussed herein.

The machine 700 may include processors 704, memory/storage 706, and I/O components 718, which may be configured to communicate with each other such as via a bus 702. The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor's cache memory), or any suitable combination thereof, during execution thereof by the machine 700. Accordingly, the memory 714, the storage unit 716, and the memory of processors 704 are examples of machine-readable media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environmental components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environmental components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 738 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 724 and coupling 722, respectively. For example, the communication components 740 may include a network interface component or other suitable device to interface with the network 732. In further examples, communication components 740 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a USB).

Moreover, the communication components 740 may detect identifiers or include components operable to detect identifiers. For example, the communication components 740 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF41.7, Ultra Code, UCC RSS-2D bar code, and other optical codes), or acoustic detection components (e.g., microphones to identify tagged audio signals). In addition, a variety of information may be derived via the communication components 740 such as location via Internet Protocol (IP) geo-location, location via Wi-Fi® signal triangulation, location via detecting a NFC beacon signal that may indicate a particular location, and so forth.

"CARRIER SIGNAL" in this context refers to any intangible medium that is capable of storing, encoding, or carrying instructions 710 for execution by the machine 700, and includes digital or analog communications signals or other intangible medium to facilitate communication of such instructions 710. Instructions 710 may be transmitted or received over the network 732 using a transmission medium via a network interface device and using any one of a number of well-known transfer protocols.

"CLIENT DEVICE" in this context refers to any machine 700 that interfaces to a communications network 732 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 732.

"COMMUNICATIONS NETWORK" in this context refers to one or more portions of a network 732 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 732 or a portion of a network 732 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 710 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 710. The term "machine-readable medium" shall also be taken to include any medium, or combination of multiple media, that is capable of storing instructions 710 (e.g., code) for execution by a machine 700, such that the instructions 710, when executed by one or more processors 704 of the machine 700, cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" refers to "non-transitory" machine-readable mediums and excludes signals or other "transitory" computer readable mediums. A "non-transitory" machine-readable medium is a physical device that can store data for a period of time during which the stored data may be transferrable or reproducible. Examples of a non-transitory machine-readable medium are a physical memory device, Random Access Memory (RAM), etc. In contrast, transitory machine-readable mediums are not physical and store data only momentarily, such as a signal.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 704 or other programmable processor 704. Once configured by such software, hardware components become specific machines 700 (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 704 configured by software to become a special-purpose processor, the general-purpose processor 704 may be configured as respectively different special-purpose processors (e.g., comprising different hardware components) at different times. Software accordingly configures a particular processor or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 702) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an API). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"PROCESSOR" in this context refers to any circuit or virtual circuit (a physical circuit emulated by logic executing on an actual processor 704) that manipulates data values according to control signals (e.g., "commands," "op codes," "machine code," etc.) and which produces corresponding output signals that are applied to operate a machine 700. A processor 704 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 704 may further be a multi-core processor having two or more independent processors 704 (sometimes referred to as "cores") that may execute instructions 710 contemporaneously.

What is claimed is:

1. A method for symmetric cryptography using varying sized symbol sets, the method comprising:

accessing, by a transmitting device, a first symmetric key and a first cryptography configuration data item corresponding to the first symmetric key, the first cryptography configuration data item identifying a first symbol set including a first number of unique symbols and a second symbol set including a second number of unique symbols, the first number being different than the second number, and a first data size corresponding to the first symbol set and a second data size corresponding to the second symbol set, the first data size being different than the second data size;

encrypting a data item with the first symmetric key according to the first cryptography configuration data item, yielding an encrypted data item, wherein encrypting the first data item comprises:

encrypting a first portion of the data item based on the first symbol set, wherein a size of the first portion of the data item is based on the first data size; and encrypting a second portion of the data item based on the second symbol set, wherein a size of the second portion of the data item is based on the second data size; and transmitting the encrypted data item to a first receiving device that has been allocated the first symmetric key and the first cryptography configuration data item, the first receiving device decrypting the encrypted data item with the first cryptography configuration data item according to the first cryptography configuration data item.

2. The method of claim 1, wherein encrypting the first portion of the data item based on the first symbol set comprises:

grouping a set of input bits included in the first portion of the data item into a first set of input bit groupings based on the first number of unique symbols included in the first symbol set, each input bit grouping in the first set of input bit groupings representing one symbol from the first symbol set;

grouping a set of key bits included in a first portion of the first symmetric key into a first set of key bit groupings based on the first number of unique symbols included in the first symbol set, each key bit groupings in the first set of key bit groupings representing one symbol from the first symbol set; and providing the first set of input bit groupings and the first set of key bit groupings as input into a cryptography algorithm, yielding a first set of encrypted bit groupings, each encrypted bit grouping in the first set of encrypted bit groupings representing one symbol from the first symbol set.

3. The method of claim 2, wherein the first set of input bit groupings includes one input bit grouping, the first set of key bit groupings includes one key bit grouping, and the first set of encrypted bit groupings includes one encrypted bit grouping.

4. The method of claim 2, wherein encrypting the second portion of the data item based on the second symbol set comprises:

grouping a second set of input bits included in the second portion of the data item into a second set of input bit groupings based on the second number of unique symbols included in the second symbol set, each input bit grouping in the second set of input bit groupings representing one symbol from the second symbol set;

grouping a second set of key bits included in a second portion of the first symmetric key into a second set of key bit groupings based on the second number of unique symbols included in the second symbol set, each key bit groupings in the second set of key bit groupings representing one symbol from the second symbol set; and providing the second set of input bit groupings and the second set of key bit groupings as input into the cryptography algorithm, yielding a second set of encrypted bit groupings, each encrypted bit grouping in the second set of encrypted bit groupings representing one symbol from the second symbol set.

5. The method of claim 1, further comprising:

accessing a second symmetric key and a second cryptography configuration data item corresponding to the second symmetric key, the second cryptography configuration data item being different than the first cryptography configuration data item;

encrypting a second data item with the second symmetric key according to the second cryptography configuration data item, yielding a second encrypted data item; and transmitting the second encrypted data item to a second receiving device that has been allocated the second symmetric key and the second cryptography configuration data item, the second receiving device decrypting the second encrypted data item with the second symmetric key based on the second cryptography configuration data item.

6. The method of claim 1, wherein encrypting the first data item further comprises:

encrypting a third portion of the data item based on a third symbol set identified by the first cryptography configuration data item, the third symbol set including a third number of unique symbols, the third number being different than the first number and the second number.

7. The method of claim 6, wherein a size of the third portion of the data item is based on a third data size corresponding to the third symbol set.

8. A system for symmetric cryptography using varying sized symbol sets, the system comprising:

a transmitting device comprising one or more processors and a communication component, wherein the one or more processors of the transmitting device are configured to perform operations comprising:

accessing, from a memory of the transmitting device, a first symmetric key and a first cryptography configuration data item corresponding to the first symmetric key, the first cryptography configuration data item identifying a first symbol set including a first number of unique symbols and a second symbol set including a second number of unique symbols, the first number being different than the second number, and a first data size corresponding to the first symbol set and a second data size corresponding to the second symbol set, the first data size being different than the second data size;

encrypting a data item with the first symmetric key according to the first cryptography configuration data item, yielding an encrypted data item, wherein encrypting the first data item comprises:

encrypting a first portion of the data item based on the first symbol set, wherein a size of the first portion of the data item is based on the first data size; and encrypting a second portion of the data item based on the second symbol set, wherein a size of the second portion of the data item is based on the second data size; and transmitting, using the communication component, the encrypted data item to a receiving device that has been allocated the first symmetric key and the first cryptography configuration data item, the receiving device decrypting the encrypted data item with the first cryptography configuration data item according to the first cryptography configuration data item.

9. The system of claim 8, further comprising the receiving device, the receiving device comprising one or more processors and a communication component, wherein the one or more processors of the receiving device are configured to perform operations comprising:

receiving, using the communication component, the encrypted data item from the transmitting device; and decrypting the encrypted data item using the first symmetric key allocated to the receiving device and the first cryptography configuration data item corresponding to the first symmetric key.

10. The system of claim 9, wherein decrypting the encrypted data item using the first symmetric key allocated to the receiving device and the first cryptography configuration data item corresponding to the first symmetric key comprises:

decrypting a first portion of the encrypted data item based on the first symbol set; and decrypting a second portion of the encrypted data item based on the second symbol set.

11. The system of claim 8, wherein encrypting the first portion of the data item based on the first symbol set comprises:

grouping a set of input bits included in the first portion of the data item into a first set of input bit groupings based on the first number of unique symbols included in the first symbol set, each input bit grouping in the first set of input bit groupings representing one symbol from the first symbol set;

grouping a set of key bits included in a first portion of the first symmetric key into a first set of key bit groupings based on the first number of unique symbols included in the first symbol set, each key bit groupings in the first set of key bit groupings representing one symbol from the first symbol set;

providing the first set of input bit groupings and the first set of key bit groupings as input into a cryptography algorithm, yielding a first set of encrypted bit groupings, each encrypted bit grouping in the first set of encrypted bit groupings representing one symbol from the first symbol set.

12. The system of claim 11, wherein the first set of input bit groupings includes one input bit grouping, the first set of key bit groupings includes one key bit grouping, and the first set of encrypted bit groupings includes one encrypted bit grouping.

13. The system of claim 11, wherein encrypting the second portion of the data item based on the second symbol set comprises:

grouping a second set of input bits included in the second portion of the data item into a second set of input bit groupings based on the second number of unique symbols included in the second symbol set, each input bit grouping in the second set of input bit groupings representing one symbol from the second symbol set;

grouping a second set of key bits included in a second portion of the first symmetric key into a second set of key bit groupings based on the second number of unique symbols included in the second symbol set, each key bit groupings in the second set of key bit groupings representing one symbol from the second symbol set;

providing the second set of input bit groupings and the second set of key bit groupings as input into the cryptography algorithm, yielding a second set of encrypted bit groupings, each encrypted bit grouping in the second set of encrypted bit groupings representing one symbol from the second symbol set.

14. The system of claim 8, the operations further comprising:

accessing a second symmetric key and a second cryptography configuration data item corresponding to the second symmetric key, the second cryptography configuration data item being different than the first cryptography configuration data item;

encrypting a second data item with the second symmetric key according to the second cryptography configuration data item, yielding a second encrypted data item; and transmitting the second encrypted data item to a second receiving device that has been allocated the second symmetric key and the second cryptography configuration data item, the second receiving device decrypting the second encrypted data item with the second symmetric key based on the second cryptography configuration data item.

15. The system of claim 8, wherein encrypting the first data item further comprises:

encrypting a third portion of the data item based on a third symbol set identified by the first cryptography configuration data item, the third symbol set including a third number of unique symbols, the third number being different than the first number and the second number.

16. The system of claim 15, wherein a size of the third portion of the data item is based on a third data size corresponding to the third symbol set.

17. A machine-readable medium storing instructions that, when executed by one or more computer processors of a transmitting device, cause the transmitting device to perform operations for symmetric cryptography using varying sized symbol sets, wherein the instructions, the instructions comprising:

accessing a first symmetric key and a first cryptography configuration data item corresponding to the first symmetric key, the first cryptography configuration data item identifying a first symbol set including a first number of unique symbols and a second symbol set including a second number of unique symbols, the first number being different than the second number, and a first data size corresponding to the first symbol set and a second data size corresponding to the second symbol set, the first data size being different than the second data size;

encrypting a data item with the first symmetric key according to the first cryptography configuration data item, yielding an encrypted data item, wherein encrypting the first data item comprises:

encrypting a first portion of the data item based on the first symbol set, wherein a size of the first portion of the data item is based on the first data size; and encrypting a second portion of the data item based on the second symbol set, wherein a size of the second portion of the data item is based on the second data size; and transmitting the encrypted data item to a first receiving device that has been allocated the first symmetric key and the first cryptography configuration data item, the first receiving device decrypting the encrypted data item with the first cryptography configuration data item according to the first cryptography configuration data item.

18. The machine-readable medium of claim 17, wherein encrypting the first portion of the data item based on the first symbol set comprises:

grouping a set of input bits included in the first portion of the data item into a first set of input bit groupings based on the first number of unique symbols included in the first symbol set, each input bit grouping in the first set of input bit groupings representing one symbol from the first symbol set;

grouping a set of key bits included in a first portion of the first symmetric key into a first set of key bit groupings based on the first number of unique symbols included in the first symbol set, each key bit groupings in the first set of key bit groupings representing one symbol from the first symbol set; and providing the first set of input bit groupings and the first set of key bit groupings as input into a cryptography algorithm, yielding a first set of encrypted bit groupings, each encrypted bit grouping in the first set of encrypted bit groupings representing one symbol from the first symbol set.

19. The machine-readable medium of claim 18, wherein the first set of input bit groupings includes one input bit grouping, the first set of key bit groupings includes one key bit grouping, and the first set of encrypted bit groupings includes one encrypted bit grouping.

20. The machine-readable medium of claim 18, wherein encrypting the second portion of the data item based on the second symbol set comprises:

grouping a second set of input bits included in the second portion of the data item into a second set of input bit groupings based on the second number of unique symbols included in the second symbol set, each input bit grouping in the second set of input bit groupings representing one symbol from the second symbol set;

grouping a second set of key bits included in a second portion of the first symmetric key into a second set of key bit groupings based on the second number of unique symbols included in the second symbol set, each key bit groupings in the second set of key bit groupings representing one symbol from the second symbol set; and providing the second set of input bit groupings and the second set of key bit groupings as input into the cryptography algorithm, yielding a second set of encrypted bit groupings, each encrypted bit grouping in the second set of encrypted bit groupings representing one symbol from the second symbol set.

* * * * *